June 21, 1955  S. R. JOHNSON  2,711,147
METHOD OF FORMING CAN BODIES
Filed Dec. 10, 1951

INVENTOR.
Scott R. Johnson
BY
Mason, Porter, Diller & Stewart

United States Patent Office 2,711,147
Patented June 21, 1955

2,711,147
METHOD OF FORMING CAN BODIES

Scott R. Johnson, River Forest, Ill., assignor to Continental Can Company, Inc., New York, N. Y., a corporation of New York Application December 10, 1951, Serial No. 260,830

1 Claim. (Cl. 113—120)

The invention relates generally to the art of making metal can bodies and primarily seeks to provide a novel method of forming can bodies so that an efficient solder bond will be assured as seam portions adjacent the body ends both before and after flanging of said body ends.

In the manufacture of can bodies it is common practice to shape metal body blanks about a horn, bringing the longitudinal marginal edge portions of blanks together in the form of side seams extending from end to end of the can bodies. Various forms of side seams are made, the most common being the simple lapped seam in which the edges of the blank are lapped throughout the length of each can body, and the well known lock and lap seam in which the major portion of the seam is composed of interlocked inner and outer hooks and a short end portion adjacent each can body end is made up of simple lapped blank edge portions so as to present the minimum of two thicknesses of metal at the body ends which must be flanged and seam secured to end closures in the well know manner. It is common practice to solder bond the side seams, and a problem is presented in the making of can bodies having solder bonded side seams by reason of the rather frequent rupturing of lapped end portions of the side seams during flanging of the body ends. Incidental to the outward turning of the can body flanges, by any of the well known methods of which roll and die engagement or endwise movement of flanging dies are examples, the perimeter of the can end edge is considerably enlarged and the metal at the bend is stretched on one side and compressed on the other in such manner as to bring about a tendency of the lapped edges of the seam end portions to move one with respect to the other, and strains thus produced frequently cause the solder bond to rupture and ultimately result in provision of a leaky can. It is the purpose of the present invention to provide a novel can body forming method which will solve the problem referred to by reducing to a safe minimum strains tending to cause the solder bonded and lapped seam end portions to move one relative to another and rupture the solder bond.

An object of the invention is to provide a novel method of forming a can body without setting up seam rupturing strains during turning of a flange at an end of the can body which comprises, forming the can body with a solder bonded side seam including a lapped seam portion at an end thereof and with a body end edge adjacent and at each side of the lapped seam portion corrugated or indented radially to provide an enlargement of the can end edge perimeter effective when the flange is turned outwardly to compensate for the can end edge perimeter enlargement resulting from the flange turning without imposing a rupturing strain on said lapped seam portion, and turning a flange outwardly at the can end having the lapped seam portion in a manner for substatnially taking up and smoothing out of said corrugations or indents.

Another object of the invention is to provide a novel can body forming method of the character stated in which the corrugating of the can end edge constitutes a radial inward corrugation.

Another object of the invention is to provide a novel can body forming method of the character stated wherein the corrugating of the can end edge is so performed as to place the corrugations wholly within the area which is to be turned into a flange so that the corrugations will not extend beyond the flange into the main body of the can after the flange is turned.

With the above and other objects in view that will hereinafter appear, the nature of the invention will be more clearly understood by reference to the following detailed description, the appended claim, and the several views illustrated in the accompanying drawing.

Figure 4:
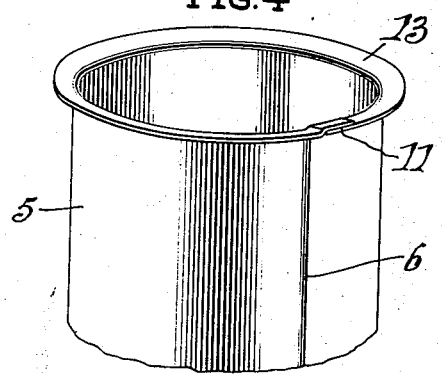
Figure 4 is a fragmentary perspective view illustrating an end of the can body shown in part in Figure 1, the usual flange being shown as turned on said body end.
Figure 6:
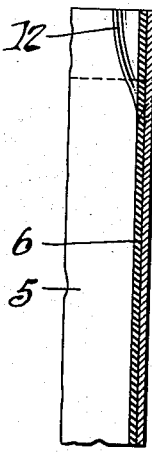
Figure 6 is an enlarged vertical longitudinal section taken through the lapped side seam of Figure 1 before the turning of the flange, the flange being shown as turned in dotted lines.

In the example of embodiment of the invention disclosed herein, 5 designates a conventional can body formed from a blank by shaping the blank about a horn and bringing its longitudinal marginal edges into overlapping relation to form a conventional lapped side seam 6. This structure is shown in Figures 4 and 6 and it is to be understood that the lapped side seam 6 is solder bonded. The invention is not limited to a can body having any particular form of side seam, except that said seam should include a solder bonded lapped seam portion at an end thereof on which a flange is to be outwardly turned.

Another example of can body meeting the requirement specified is shown in Figures 2, 3, 5 and 7, this example can body being designated 7 and including the conventional lock and lap side seam 8, composed of interlocked inner and outer hooks designated 9 and 10 respectively throughout the major portion of its length, and having the usual lapped seam portion 11 at each end thereof and designed to present the minimum of two thicknesses of metal at the body ends which must be flanged and seam secured to end closures in the well known manner. As before stated, the invention can be practiced in the making of can bodies of various sizes and shapes and including various side seam structures so long as the seams include the solder bonded lapped seam portions at the ends thereof whereon flanges are to be formed, as shown in Figures 4 and 6, 5 and 7 respectively.

Figure 1:
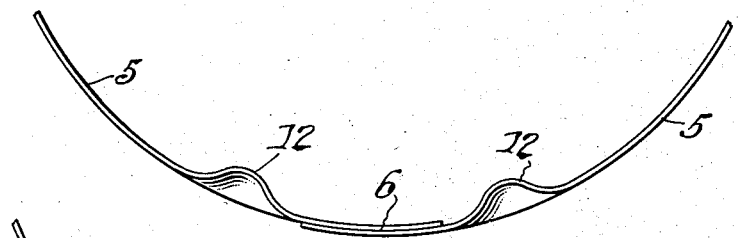
Figure 1 is a fragmentary end view of a can body formed in accordance with the invention, a can body of the lapped side seam type being shown.
Figure 2:
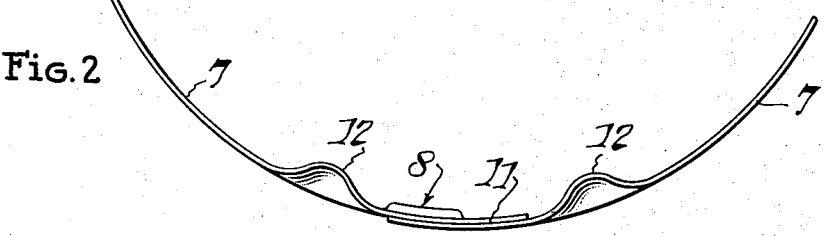
Figure 2 is a view similar to Figure 1 and illustrating a can body having a lock and lap side seam.
Figure 3:
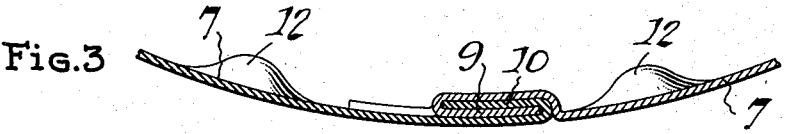
Figure 3 is an enlarged horizontal section taken across the lock portion of the lock and lap side seam of Figure 2 and looking toward an end of the can body.

Regardless of the shape of the particular can body, or the particular form of side seam thereon, a corrugation or protuberance 12 is provided in its end edge at each side of and adjacent the lapped portion 6 of Figure 1 or 11 of Figure 2. It is preferred that the corrugation or protuberance in each instance be directed inwardly as shown and that it parallel the adjacent side seam portion. In other words the body metal at the end edge and adjacent the lapped seam portion at each side is corrugated or displaced radially inwardly so as to stretch the metal and provide an enlargement of the can edge perimeter or in other words an increase in the distance around the can at its end edge and for a distance inwardly endwise of said end edge.

Figure 7:
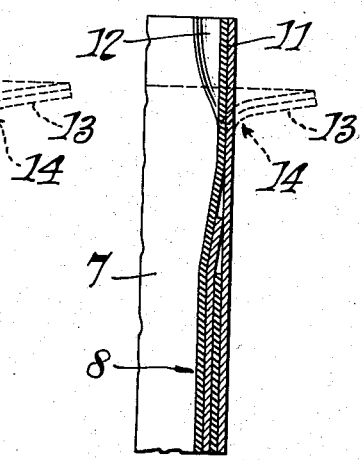
Figure 7 is a view similar to Figure 6, the section being taken through the lock and lap side seam of Figures 2 and 3.
Figure 5:
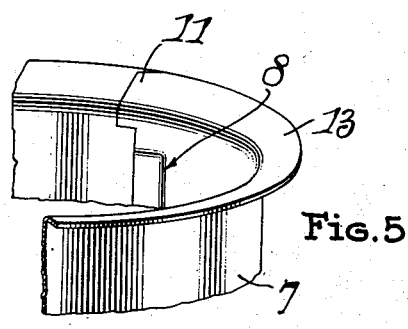
Figure 5 is an enlarged fragmentary perspective view illustrating the portion of the can end of Figure 3 including the lock and lap side seam, the usual flange being shown as turned on said body end.

It is well known that when a can end is flanged, the perimeter of the can end edge, or the distance therearound, is considerably enlarged, and that the metal at the bend is stretched on one side and compressed on the other side in such manner as to bring about a tendency of the lapped edges of the seam end portions to move one with respect to the other, and strains thus produced frequently cause the solder bond to rupture. However, by providing the protuberances or corrugations or stretched metal portions 12, said portions are effective, when a flange is turned outwardly, to compensate for the can end edge perimeter enlargement resulting from said flange turning without imposing a rupturing strain on the solder bonded lapped seam portion. As the flange is thus turned, the increasing perimeter thereof will substantially take up and smooth out the corrugations or protuberances 12 so that the flanges will appear smooth, substantially as shown in Figures 4 and 5. Should any slight wave remain in the turned flange, this would be ironed out in the conventional seaming on of an end closure without any danger whatever of providing an inefficient, leaky seal. Figures 6 and 7 respectively illustrate the lapped seam of Figure 4 and the lock and lapped seam of Figure 5 in vertical longitudinal section, the initial condition of the corrugations or can body end edge enlargements or displacements 12 being shown in full lines, and the bending outward of the flanges 13 and the smoothing out of said corrugations being indicated in dotted lines in said figures.

In the making up of the can bodies, the blanks may be shaped about a horn and their longitudinal marginal edges brought together in the usual way to form the side seam, examples of such seams disclosed herein being the lapped seam of Figures 1, 4 and 6, and the lock and lap seam of Figures 2, 3, 5 and 7. The side seams are solder bonded in the well known manner, and it is to be understood that the invention comprehends within its scope the formation of the corrugations or can end edge enlargements 12 before or after the shaping up of the bodies, also before or after the solder bonding. The completion of the method may be by way of turning out the flanges 13 in the manner indicated in Figures 6 and 7, and it will be noted that the bend 14 in each flange will come below the lower extremities of the corrugations or end edge enlargements 12 so that said corrugations or enlargements will be placed wholly within the outwardly turned flanges and not extend down into the main wall of the body. As before stated, any slight wave remaining in a given flange after formation thereof will thus be confined to the flange and worked into the seam by which an end closure is secured on the can body. Thus the purpose of assuring that flanges can be turned without danger of rupturing the solder bond in the lapped seam portions extending into such flanges is attained, and the provision of secure, non-leaky seals also is assured.

While example disclosures of the novel method are disclosed herein it is to be understood that variations in the timing of the method steps and in the form and placement of the seams and indents or can end edge enlargements may be made without departing from the spirit and scope of the invention as defined in the appended claim.

I claim:

The herein disclosed method of forming a flanged can body without setting up seam rupturing strains during the turning of a flange at an end of the can body which comprises, forming the can body with a solder bonded side seam including a lapped seam portion at an end thereof and with a body end edge extremity having only two radially inward corrugations one at each side of the side seam and parallel and adjacent thereto to provide in said corrugations an enlargement of the can end edge perimeter effective when the flange is turned outwardly to compensate for the can end edge perimeter enlargement resulting from said flange turning without imposing a rupturing strain on said lapped seam portion, and turning a flange outwardly at the can end having said lapped seam portion and proportioned with relation to said corrugations with the flange bend placed so as to include the whole of each can end edge enlargement corrugation within the flange width and in a manner for substantially taking up and smoothing out said corrugations.

References Cited in the file of this patent
UNITED STATES PATENTS

| Re. 17,397 | Gray | Aug. 6, 1929 |
|---|---|---|
| 782,509 | Livingstone | Feb. 14, 1905 |
| 1,246,583 | Fulweiler | Nov. 13, 1917 |
| 1,316,237 | Hodgson | Sept. 16, 1919 |
| 1,389,900 | Robinson | Sept. 6, 1921 |
| 1,755,666 | Schaal | Apr. 22, 1930 |
| 1,765,182 | Tomkins | June 17, 1930 |
| 1,962,280 | McLhinney | June 12, 1934 |
| 2,120,038 | O'Neil | June 7, 1938 |
| 2,303,019 | Burdorf | Nov. 24, 1942 |
| 2,335,916 | Coyle | Dec. 7, 1943 |
| 2,346,619 | Schrader | Apr. 11, 1944 |
| 2,350,824 | Rojo | June 6, 1944 |
| 2,629,421 | Ayres | Feb. 24, 1953 |